United States Patent
Sampey et al.

(10) Patent No.: US 12,293,383 B2
(45) Date of Patent: May 6, 2025

(54) SYSTEMS AND METHODS FOR MINIMIZING FRAUD IN THE PROMOTIONAL OFFER INDUSTRY

(71) Applicant: SKUXCHANGE, LLC, St. Petersburg, FL (US)

(72) Inventors: James Sampey, Indian Rocks Beach, FL (US); Bobby Tinsley, Palmetto, FL (US); Robert Zaccardo, St. Petersburg, FL (US); Kenneth Douglas, Bradenton, FL (US); Moshe Joshua, Woodmere, NY (US); Norberto Maio, St. Petersburg, FL (US)

(73) Assignee: SkuXchange, LLC, St. Petersburg, FL (US)

( * ) Notice: Subject to any disclaimer, the term of this patent is extended or adjusted under 35 U.S.C. 154(b) by 0 days.

(21) Appl. No.: 16/503,994

(22) Filed: Jul. 5, 2019

(65) Prior Publication Data

US 2021/0004857 A1 Jan. 7, 2021

(51) Int. Cl.
*G06Q 30/0207* (2023.01)
*G06Q 30/0226* (2023.01)

(52) U.S. Cl.
CPC ..... *G06Q 30/0225* (2013.01); *G06Q 30/0215* (2013.01); *G06Q 30/0233* (2013.01)

(58) Field of Classification Search
CPC .......... G06Q 30/0215; G06Q 30/0225; G06Q 30/0238
See application file for complete search history.

(56) References Cited

U.S. PATENT DOCUMENTS

| | | | | |
|---|---|---|---|---|
| 2011/0208656 | A1* | 8/2011 | Alba | G06Q 20/20 705/65 |
| 2015/0348169 | A1* | 12/2015 | Harris | G06Q 30/0633 705/26.8 |

(Continued)

OTHER PUBLICATIONS

Rajendran et al., "Secure and Privacy Preserving Digital Payment" (published in 2017 IEEE SmartWorld, Ubiquitous Intelligence & Computing, Advanced & Trusted Computed, Scalable Computing & Communications, Cloud & Big Data Computing, Internet of People and Smart City Innovation, pp. 1-5. (Year: 2017).*

*Primary Examiner* — Resha Desai
*Assistant Examiner* — Patrick Kim
(74) *Attorney, Agent, or Firm* — Dax D. Anderson; Kirton McConkie

(57) ABSTRACT

Systems and methods for managing the promotional offer industry offer, redemption, and settlement processes address and minimize fraud, better inform the business offering the promotion of the results of the promotional offer program, and facilitate improvements in the settlement process after offer redemption. A method includes steps of receiving an indication of interest in the promotional offer, associating a one-time-use unique bank card number with the promotional offer, and transmitting the bank card number to the consumer computing device as an accepted promotional offer, whereby the consumer is enabled to use the bank card number at a point of sale to redeem the accepted promotional offer. The method also includes steps of receiving, over the communications network, an indication that the bank card number was used at the point of sale to redeem the accepted promotional offer and allocating payment for redemption of the promotional offer.

20 Claims, 5 Drawing Sheets

(56) References Cited

U.S. PATENT DOCUMENTS

2017/0308902 A1* 10/2017 Quiroga ............... G06Q 20/351
2017/0323294 A1* 11/2017 Rohlfing ............... H04L 9/3239
2018/0150865 A1*  5/2018 Arora ................... G06Q 20/389
2019/0295119 A1*  9/2019 Basu .................... G06Q 20/386

* cited by examiner

SYSTEMS AND METHODS FOR MINIMIZING FRAUD IN THE PROMOTIONAL OFFER INDUSTRY

BACKGROUND OF THE INVENTION

1. Field of the Invention

The present invention relates to the promotional offer industry, and more particularly to reducing fraud and speeding settlement for redeemed promotional offers.

2. Background and Related Art

In the promotional offer industry, including, without limitation, coupon programs, loyalty programs, and real-time payment programs, there are currently limited protections against fraud and accordingly a limited return on investment by participants in the promotional offer industry. For example, using traditional methods, a manufacturer issues coupons for its products and then has little or no control over coupon redemption and payment or effects of the couponing program until later (whether thirty days, sixty days, or six months later), when the manufacturer discovers how well the coupon program worked. At the same time, there is a significant risk of fraud in generation of fraudulent coupons, fraudulent reporting of redemption, and the like.

A significant problem inherent in the promotional offer industry is the convoluted redemption (reconciliation and settlement) process. It is typical for redeemed coupons to be collected at the point of sale then shipped out of country to a location where inexpensive labor can be sourced for coupon counting. Coupon counting is typically done by hand in such locations, though in some instances, coupons are not actually counted, but the number of coupons redeemed is estimated based solely on weight. It is not uncommon for a certain amount of fraud in the process to simply be assumed, whereby retailers where coupons were redeemed do not receive the full value of collected and redeemed coupons, but instead receive some percentage thereof, such as 80%, whether or not the retailer participated in any fraudulent activity relating to redemptions of the promotional offer. Accordingly, under current promotional offer redemption practices, the existence of fraud harms all participants of the promotional offer process.

BRIEF SUMMARY OF THE INVENTION

Implementation of the invention provides systems and methods for managing the promotional offer industry offer, redemption, and settlement processes in ways that address and minimize fraud, better inform the business offering the promotion of the results of the promotional offer program, and facilitate improvements in the settlement process after offer redemption. Implementation of the invention provides methods for preventing or reducing fraud in the promotional offer industry, as well as systems for implementing such methods, such as computer systems and networked computer system, as well as non-transitory computer-readable media for causing computer systems to implement such methods. Implementation of the invention may be performed using computer systems managed by a single entity as well as in distributed computing environments wherein aspects of the method are implemented by disparate parties.

According to certain implementations of the invention, a method for preventing fraud in the promotional offer industry includes steps of determining that a consumer operating a consumer computing device is eligible to receive a promotional offer and transmitting to the consumer computing device over an electronic communications network information about the promotional offer. The method further includes steps of receiving from the consumer computing device over the communications network an indication of interest in the promotional offer, associating a one-time-use unique bank card number with the promotional offer, and transmitting the bank card number to the consumer computing device as an accepted promotional offer, whereby the consumer is enabled to use the bank card number at a point of sale to redeem the accepted promotional offer. The method also includes steps of receiving, over the communications network, an indication that the bank card number was used at the point of sale to redeem the accepted promotional offer and allocating payment for redemption of the promotional offer.

According to some implementations, the method includes, upon association of the bank card number with the promotional offer, writing the association of the bank card number with the promotional offer as a transaction on a blockchain and upon reception of the indication that the bank card number was used at the point of sale, writing a record of redemption of the promotional offer to the blockchain. In some implementations, payment is allocated to a merchant within three days after redemption of the accepted promotional offer. In some implementations, payment is allocated to a merchant within one day after redemption of the accepted promotional offer.

In some implementations, a value of the promotional offer is assigned to the bank card number upon association of the bank card number with the promotional offer, whereby the bank card number can be used as partial payment in an amount of the promotional offer. In some implementations, on redemption of the promotional offer at a point-of-sale electronic device, the bank card number is transmitted to a third-party bank card authorization processor. In some implementations, payment for redemption of the promotional offer is allocated to a merchant associated with the point of sale.

In some implementations, a value is not assigned to the bank card number, whereby the bank card number cannot be used as a traditional bank card for partial payment in redemption of the promotional offer. Instead, on redemption of the promotional offer, the bank card number is transmitted to a third-party bank card authorization processor for a no-value authentication that the promotional offer was used. In some implementations, payment for redemption of the promotional offer is allocated to the consumer or an account associated with the consumer.

In some implementations, the step of determining that a consumer operating a consumer computing device is eligible to receive a promotional offer includes receiving, over the communications network, an indication from the consumer computing device that the consumer computing device has entered a certain geographic area. In some implementations, determining that a consumer operating a consumer computing device is eligible to receive a promotional offer includes receiving, over the communications network, an indication from the consumer computing device representing a request from the consumer for promotional offers and determining that the promotional offer is one for which the consumer is eligible.

In some implementations, the method further includes receiving information regarding a promotional offer campaign involving providing the promotional offer to a plurality of consumers, serializing a given number of the promotional offer with unique serial numbers, recording the promotional offers on a blockchain, and when attempts to redeem the promotional offer are made, checking the blockchain to ensure that each attempted redemption relates to a valid, unredeemed promotional offer before authorizing redemption. In certain implementations, the method further includes generating a report on demand reconciling all promotional offers issued and redeemed, and transmitting the report to a manager of the promotional offer campaign.

In some implementations, receiving an indication that the bank card number was used at the point of sale to redeem the accepted promotional offer represents entry of the bank card number at a point-of-sale computing device, an authorization transaction between the point-of-sale computing device and an authorization server system, and receipt of an acknowledgement of use of the bank card number from the authorization server system.

According to further implementations of the invention, a method for preventing fraud in the promotional offer industry includes steps of receiving information regarding a promotional offer campaign involving providing a promotional offer to a plurality of consumers, receiving funding for the promotional offer campaign, representing funds and fees to provide redemption of a determined number of the promotional offer, serializing a determined number of the promotional offer with unique serial numbers, and recording the serialized promotional offers on a blockchain. The method also includes steps of determining that a consumer operating a consumer computing device is eligible to receive the promotional offer, transmitting to the consumer computing device over an electronic communications network information about the promotional offer, receiving from the consumer computing device over the communications network an indication of opting-in to the promotional offer, associating a one-time-use unique bank card number with the promotional offer, and transmitting the bank card number to the consumer computing device as an accepted promotional offer, whereby the consumer is enabled to use the bank card number at a point of sale to redeem the accepted promotional offer. The method also includes steps of receiving, over the communications network, an indication that the bank card number was used at the point of sale to redeem the accepted promotional offer as a redeemed promotional offer, confirming on the blockchain that the redeemed promotional offer has not yet been used, allocating payment for redemption of the promotional offer, and updating the blockchain to show that the redeemed promotional offer has been used.

In some implementations, the method further includes assigning a value of the promotional offer to the bank card number upon association of the bank card number with the promotional offer, whereby the bank card number can be used as partial payment in an amount of the promotional offer. In some implementations, on redemption of the promotional offer at a point-of-sale electronic device, the bank card number is transmitted to a third-party bank card authorization processor. In some implementations, payment for redemption of the promotional offer is allocated to a merchant associated with the point of sale.

In further implementations, a value is not assigned to the bank card number, whereby the bank card number cannot be used as a traditional bank card for partial payment in redemption of the promotional offer, but on redemption of the promotional offer, the bank card number is transmitted to a third-party bank card authorization processor for a no-value authentication that the promotional offer was used. In some implementations, payment for redemption of the promotional offer is allocated to the consumer or an account associated with the consumer.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
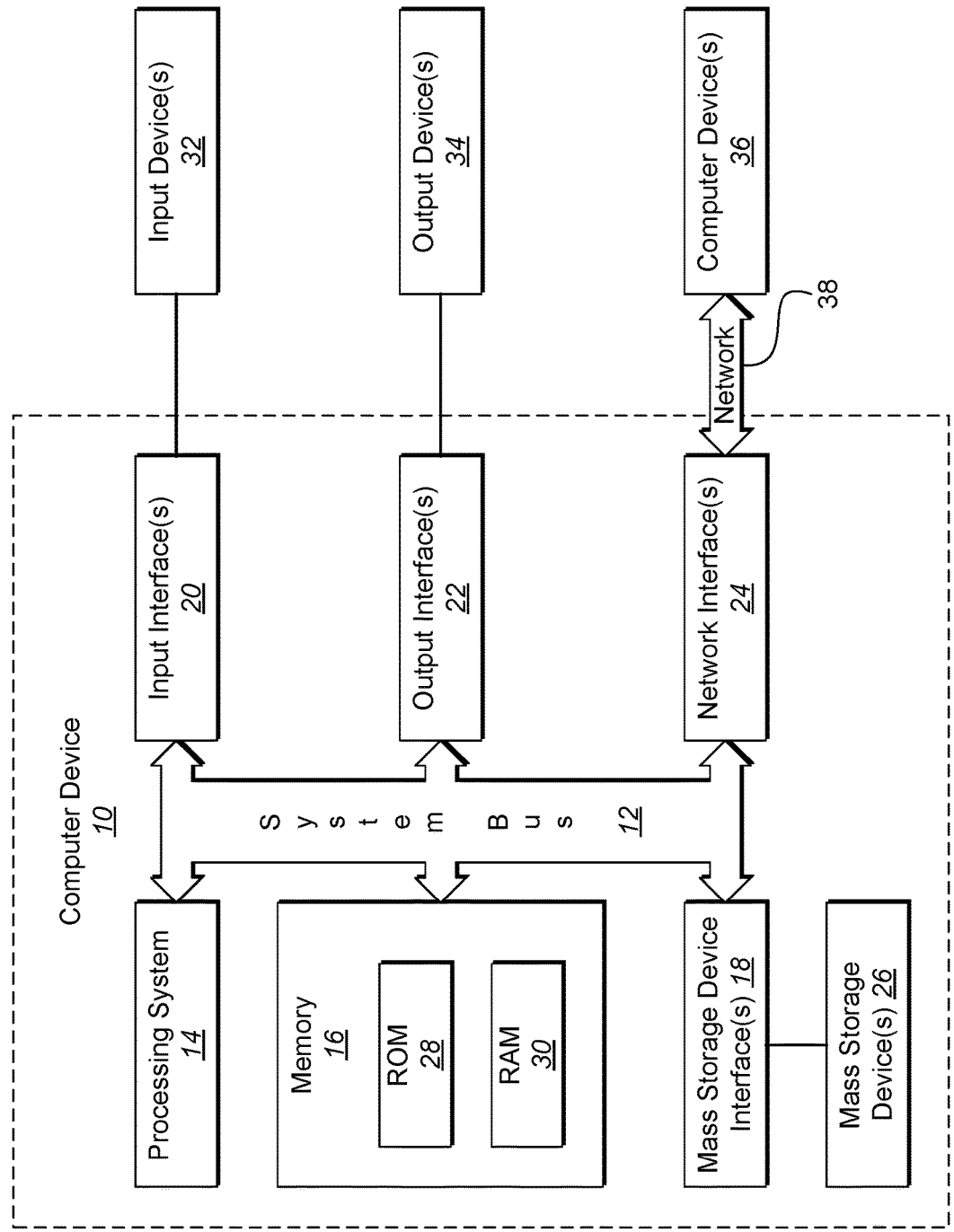
FIG. 1 shows a representative computer system for use with embodiments of the invention.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide systems and methods for managing the promotional offer industry offer, redemption, and settlement processes in ways that address and minimize fraud, better inform the business offering the promotion of the results of the promotional offer program, and facilitate improvements in the settlement process after offer redemption. Embodiments of the invention provide methods for preventing or reducing fraud in the promotional offer industry, as well as systems for implementing such methods, such as computer systems and networked computer system, as well as non-transitory computer-readable media for causing computer systems to implement such methods. Embodiments of the invention may be performed using computer systems managed by a single entity as well as in distributed computing environments wherein aspects of the method are implemented by disparate parties.

According to certain embodiments of the invention, a method for preventing fraud in the promotional offer industry includes steps of determining that a consumer operating a consumer computing device is eligible to receive a promotional offer and transmitting to the consumer computing device over an electronic communications network information about the promotional offer. The method further includes steps of receiving from the consumer computing device over the communications network an indication of interest in the promotional offer, associating a one-time-use unique bank card number with the promotional offer, and transmitting the bank card number to the consumer computing device as an accepted promotional offer, whereby the consumer is enabled to use the bank card number at a point of sale to redeem the accepted promotional offer. The method also includes steps of receiving, over the communications network, an indication that the bank card number was used at the point of sale to redeem the accepted promotional offer and allocating payment for redemption of the promotional offer.

According to some embodiments, the method includes, upon association of the bank card number with the promotional offer, writing the association of the bank card number with the promotional offer as a transaction on a blockchain and upon reception of the indication that the bank card number was used at the point of sale, writing a record of redemption of the promotional offer to the blockchain. In some embodiments, payment is allocated to a merchant within three days after redemption of the accepted promotional offer. In some embodiments, payment is allocated to a merchant within one day after redemption of the accepted promotional offer.

In some embodiments, a value of the promotional offer is assigned to the bank card number upon association of the bank card number with the promotional offer, whereby the bank card number can be used as partial payment in an amount of the promotional offer. In some embodiments, on redemption of the promotional offer at a point-of-sale electronic device, the bank card number is transmitted to a third-party bank card authorization processor. In some embodiments, payment for redemption of the promotional offer is allocated to a merchant associated with the point of sale.

In some embodiments, a value is not assigned to the bank card number, whereby the bank card number cannot be used as a traditional bank card for partial payment in redemption of the promotional offer. Instead, on redemption of the promotional offer, the bank card number is transmitted to a third-party bank card authorization processor for a no-value authentication that the promotional offer was used. In some embodiments, payment for redemption of the promotional offer is allocated to the consumer or an account associated with the consumer.

In some embodiments, the step of determining that a consumer operating a consumer computing device is eligible to receive a promotional offer includes receiving, over the communications network, an indication from the consumer computing device that the consumer computing device has entered a certain geographic area. In some embodiments, determining that a consumer operating a consumer computing device is eligible to receive a promotional offer includes receiving, over the communications network, an indication from the consumer computing device representing a request from the consumer for promotional offers and determining that the promotional offer is one for which the consumer is eligible.

In some embodiments, the method further includes receiving information regarding a promotional offer campaign involving providing the promotional offer to a plurality of consumers, serializing a given number of the promotional offer with unique serial numbers, recording the promotional offers on a blockchain, and when attempts to redeem the promotional offer are made, checking the blockchain to ensure that each attempted redemption relates to a valid, unredeemed promotional offer before authorizing redemption. In certain embodiments, the method further includes generating a report on demand reconciling all promotional offers issued and redeemed, and transmitting the report to a manager of the promotional offer campaign.

In some embodiments, receiving an indication that the bank card number was used at the point of sale to redeem the accepted promotional offer represents entry of the bank card number at a point-of-sale computing device, an authorization transaction between the point-of-sale computing device and an authorization server system, and receipt of an acknowledgement of use of the bank card number from the authorization server system.

According to further embodiments of the invention, a method for preventing fraud in the promotional offer industry includes steps of receiving information regarding a promotional offer campaign involving providing a promotional offer to a plurality of consumers, receiving funding for the promotional offer campaign, representing funds and fees to provide redemption of a determined number of the promotional offer, serializing a determined number of the promotional offer with unique serial numbers, and recording the serialized promotional offers on a blockchain. The method also includes steps of determining that a consumer operating a consumer computing device is eligible to receive the promotional offer, transmitting to the consumer computing device over an electronic communications network information about the promotional offer, receiving from the consumer computing device over the communications network an indication of opting-in to the promotional offer, associating a one-time-use unique bank card number with the promotional offer, and transmitting the bank card number to the consumer computing device as an accepted promotional offer, whereby the consumer is enabled to use the bank card number at a point of sale to redeem the accepted promotional offer. The method also includes steps of receiving, over the communications network, an indication that the bank card number was used at the point of sale to redeem the accepted promotional offer as a redeemed promotional offer, confirming on the blockchain that the redeemed promotional offer has not yet been used, allocating payment for redemption of the promotional offer, and updating the blockchain to show that the redeemed promotional offer has been used.

In some embodiments, the method further includes assigning a value of the promotional offer to the bank card number upon association of the bank card number with the promotional offer, whereby the bank card number can be used as partial payment in an amount of the promotional offer. In some embodiments, on redemption of the promotional offer at a point-of-sale electronic device, the bank card number is transmitted to a third-party bank card authorization processor. In some embodiments, payment for redemption of the promotional offer is allocated to a merchant associated with the point of sale.

In further embodiments, a value is not assigned to the bank card number, whereby the bank card number cannot be used as a traditional bank card for partial payment in redemption of the promotional offer, but on redemption of the promotional offer, the bank card number is transmitted to a third-party bank card authorization processor for a no-value authentication that the promotional offer was used. In some embodiments, payment for redemption of the promotional offer is allocated to the consumer or an account associated with the consumer.

FIG. 1 and the corresponding discussion are intended to provide a general description of a suitable operating environment in which embodiments of the invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand alone electronic devices, and other such electronic environments.

Embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

With reference to FIG. 1, a representative system for implementing embodiments of the invention includes computer device 10, which may be a general-purpose or special-purpose computer or any of a variety of consumer electronic devices. For example, computer device 10 may be a personal computer, a notebook or laptop computer, a netbook, a personal digital assistant ("PDA") or other hand-held device, a smart phone, a tablet computer, a workstation, a minicomputer, a mainframe, a supercomputer, a multi-processor system, a network computer, a processor-based consumer electronic device, a computer device integrated into another device or vehicle, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer-readable media, such as on memory 16, a solid state drive, a removable solid state drive, a magnetic hard disk, a removable magnetic disk, a magnetic cassette, an optical disk, or from a communication connection, which may also be viewed as a computer-readable medium.

Memory 16 includes one or more computer-readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include solid state drives, hard disk drives, magnetic disk drives, tape drives and optical disk drives. A mass storage device 26 may read from and/or write to solid state memory, a magnetic hard disk, a removable magnetic disk, a magnetic cassette, an optical disk, or another computer-readable medium. Mass storage devices 26 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a firewire (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
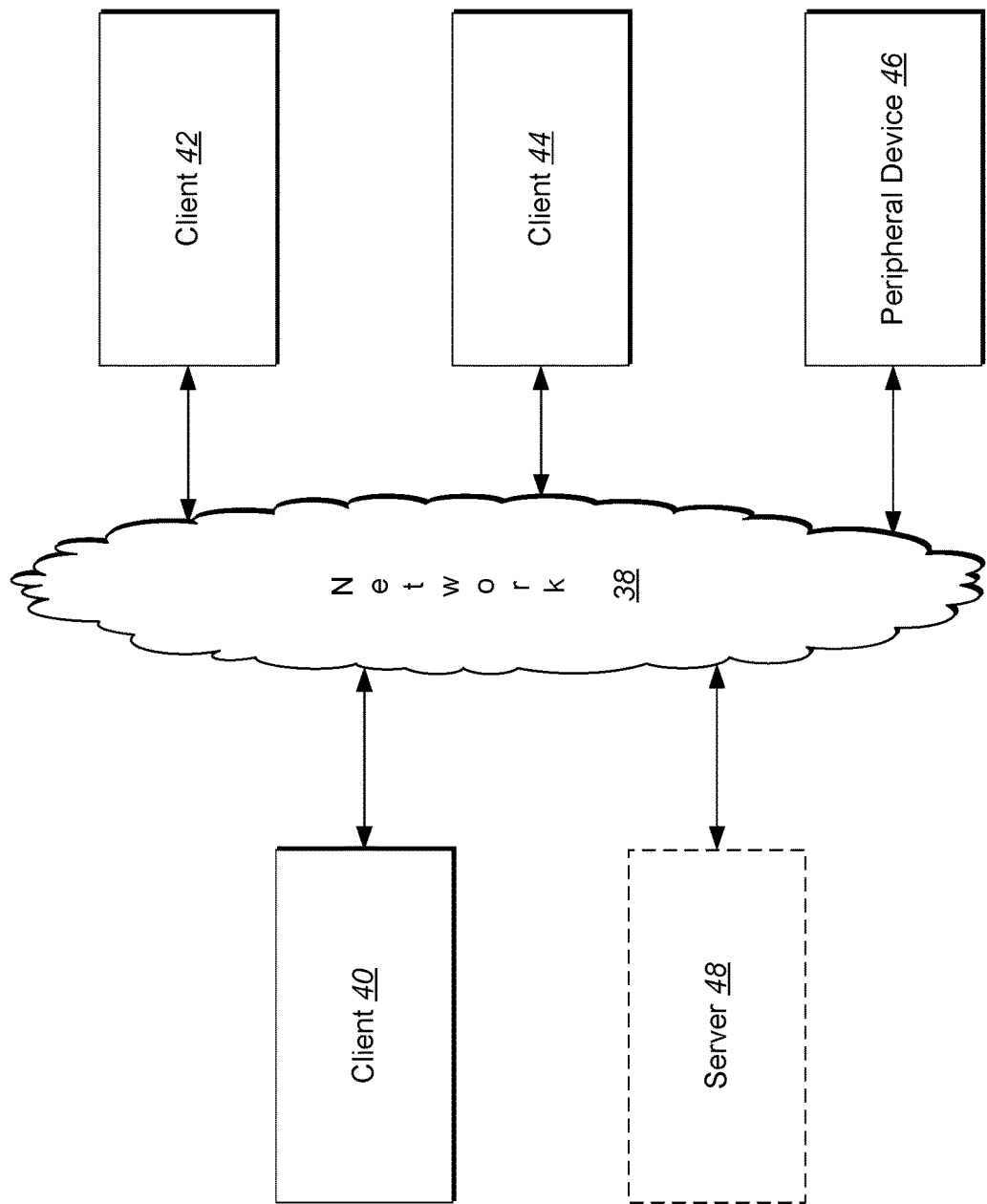
FIG. 2 shows a representative networked computer system for use with embodiments of the invention.

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 2 includes a computer device, illustrated as client 40, which is connected to one or more other computer devices (illustrated as client 42 and client 44) and one or more peripheral devices 46 across network 38. While FIG. 2 illustrates an embodiment that includes a client 40, two additional clients, client 42 and client 44, one peripheral device 46, and optionally a server 48, connected to network 38, alternative embodiments include more or fewer clients, more than one peripheral device, no peripheral devices, no server 48, and/or more than one server 48 connected to network 38. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet.

Similarly, embodiments of the invention embrace cloud-based architectures where one or more computer functions are performed by remote computer systems and devices at the request of a local computer device. Thus, returning to FIG. 2, the client 40 may be a computer device having a limited set of hardware and/or software resources. Because the client 40 is connected to the network 38, it may be able to access hardware and/or software resources provided across the network 38 by other computer devices and resources, such as client 42, client 44, server 48, or any other resources. The client 40 may access these resources through an access program, such as a web browser, and the results of any computer functions or resources may be delivered through the access program to the user of the client 40. In such configurations, the client 40 may be any type of computer device or electronic device discussed above or known to the world of cloud computing, including traditional desktop and laptop computers, smart phones and other smart devices, tablet computers, or any other device able to provide access to remote computing resources through an access program such as a browser.

Figure 3:
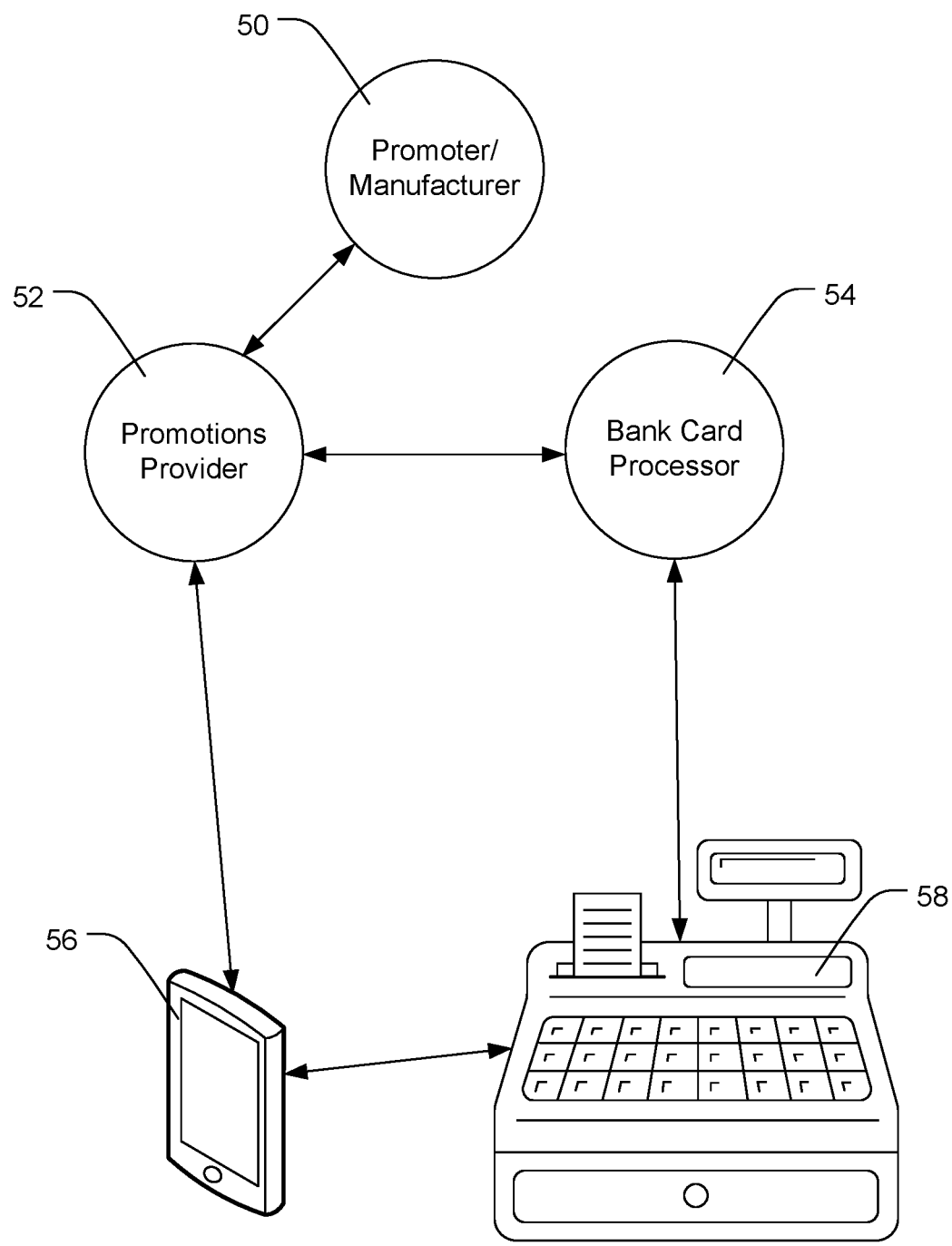
FIG. 3 shows one example of a representative environment in which embodiments of the invention may be implemented.

FIG. 3 illustrates one representative environment in which embodiments of the invention for managing promotions may be implemented. The promotion environment includes a promoter 50, which in many instances is a manufacturer of products or a provider of services, or an entity or organization operating on behalf of a manufacturer or other provider. In some circumstances, the promoter 50 may be a retail store or chain electing to offer discounts on the products it carries or services it sells. Accordingly, it should be understood that the promoter 50 illustrated in FIG. 50 may be any of a number of entities in the retail, wholesale, and promotions industry and is not intended to be limited to any particular role. What is important is that the promoter 50 is the entity that determines to begin a promotional campaign. The promoter 50 determines to generate a promotion on products or services, and engages a promotions provider 52 to operate the promotion on its behalf. In a typical example of a promotion, a promotion campaign will involve generation of a number of coupons representing a discount on the goods or services of the manufacturer/service provider that is either the promoter 50 or is represented by the promoter 50.

Historically and even often today, promotions typically involved printing and distribution of a number of generic or identical coupons in newspapers, magazines, mailers, and the like. The provision of such coupons entitled the bearer thereof to receive a discount (a percentage or set amount off) at any retailers accepting coupons provided by the manufacturer. Typically, such coupons are valid for a limited period of time, after which they are no longer accepted at retailers or other locations. The provision of generic or identical paper coupons in this manner leads to certain problems for the parties involved in the promotional offer and redemption process. Often, it can be difficult to estimate a rate at which the promotional offers will be redeemed. Additionally, paper coupons are subject to duplication attempts whereby more coupons may enter the stream of commerce than the promoter 50 originally intended. Accordingly, promoters 50 cannot predict the frequency at which coupons will be redeemed, or do anything to stop a promotion that results in greater redemption than expected, whether due to fraudulent causes or not. As a result, some promotions have resulted in promotion overspending, especially when accounting for fraudulent activity.

Traditional coupons are typically entered into point-of-sale computer systems by the owners of the point of sale, either once near the start of a promotion, or on an ongoing basis as each coupon is received. Some traditional coupons are printed with bar codes or other redemption indicia that facilitates computer-based scanning or other automated entry by the point-of-sale systems, but traditional coupons are typically identical such that they all share an identical bar code or other scanning indicia. Again, such coupons are not at all fraud resistant. Additionally, if the coupon is entered incorrectly at the point-of-sale systems, it can result in coupons being redeemed for more or less than face value, again leading to problems for the retailer and/or the promoter 50.

Systems and methods in accordance with embodiments of the invention address these and similar concerns. In the representative environment illustrated in FIG. 3, the promoter 50 (which may be a manufacturer) enters into a relationship with a promotions provider 52. In at least some embodiments, there is an electronic communicative link established between the promoter 50 and the promotions provider 52, whereby a representative of the promoter 50 is able to access systems operated by the promotions provider 52 and associated with a promotional campaign so as to review associated reports and/or to manage one or more aspects of the promotional campaign. The representative of the promoter 50 may be any person or group of persons tasked with managing the promotion on behalf of the promoter 50. In other embodiments, an electronic communications link is not established between the promoter 50 and the promotions provider 52. In some other embodiments, the promoter 50 and the promotions provider 52 are the same business entity or are divisions within a single business entity.

In the embodiment illustrated in FIG. 3, the promotions provider 52 is tasked with operating or directly managing a promotional campaign on behalf of the promoter 52. The promoter 50 and the promotions provider 52 initially establish the baseline operating conditions for the promotion. By way of example, the initial step may include defining that the promoter 52 wishes to offer a promotional campaign that will result in a total promotions redemption spend of $500,000 (or whatever desired amount), with that redemption spend being allocated to $5 coupons. Accordingly, the anticipated promotional campaign has a target of 100,000 redeemed coupons. In some embodiments, either or both of the promoter 50 or the promotions provider 52 has information from past promotional campaigns that will dictate an approximate number of coupons or other promotional offers that will have to be issued for the promotion to reach the anticipated/desired level of redemption.

To fund the promotional campaign, the promoter 50 transfers an appropriate amount of money (e.g., the $500,000 plus any fees charged by the promotions provider 52) to the promotions provider 52. At that time, the promotions provider 52 internally serializes an appropriate number of coupons or promotional offers (if in a form other than a coupon), whereby each coupon or promotional offer receives its own serial number. Because each coupon or promotional offer is individually serialized, its issuance and redemption can be tracked for a variety of purposes, including preventing fraud and double use attempts.

Accordingly, the promotions provider 52 in some embodiments adds information about the coupons or promotional offers and their serial numbers to a blockchain. Accordingly, because the coupons or promotional offers are recorded on the blockchain, they are resistant to tampering. As coupons and promotional offers are issued (offered to consumers) and then redeemed, their accompanying records on the blockchain are updated in some embodiments such that a comprehensive record of the coupons or offers is maintained. In some embodiments, redemption attempts can be checked against the blockchain before authorizing redemption to prevent fraudulent double redemption attempts, coupon/offer copying, and the like.

In some embodiments, the serial numbers assigned to the individual coupons or promotional offers are only used internally to the promotions provider 52. The serial numbers operate as an internal tracking mechanism used by the promotions provider in processes such as tracking offers issued and redeemed, and in generating reports. Such reports may include internal reports as well as reports issued to the promoter 50.

In some embodiments, the promotions provider 52 communicates with a bank card processor 54 to facilitate transactions with the coupons or other promotional offers. The bank card processor 54 may be any of a variety of current or future existing payment processors capable of authorizing and processing payments on bank cards (e.g., credit cards). By way of example, the bank card processor 54 may be an entity such as Mastercard Incorporated, capable of processing MasterCard-branded bank cards. Of course, the bank card processor 54 may be any desirable bank card processor or payment processor. In some embodiments, the promotions provider 52 and the bank card processor 54 are the same business entity or are divisions within a single business entity.

The promotions provider 52 also communicates with a consumer computing device 56 that is operated by a consumer. Accordingly, an at least intermittent communicative connection is established between one or more computing devices of the promotions provider 52 and the consumer computing device 56. Such communicative connection may be established using existing network infrastructure, including wired and wireless connections, and including use of portions of the Internet, for example. The consumer computing device 56 may be any of a variety of devices in accordance with varying embodiments of the invention. By way of example, the consumer computing device 56 may be a smart phone, a tablet computer, a laptop computer, a desktop computer, a special-purpose computing device such as an application-specific device, and the like.

The promotions provider 52, in running the promotion, makes a determination to issue a coupon or promotional offer to the consumer through the consumer computing device 56. This determination may be made in a variety of manners and taking into account a variety of factors. By way of one example, the promotions provider 52 may determine to issue a coupon or promotional offer to the consumer through the consumer computing device 56 based on a geographic location of the consumer computing device 56 (e.g., as determined via a GPS determination or by passage through a geofence as determined by GPS or RFID data). As a specific example of this, a coupon or promotional offer relating to offerings by a local convenience store (e.g., a gasoline promotion, a promotion on fountain drinks, a promotion on snacks, or the like) may be triggered upon passage of the consumer computing device 56 (in this case a mobile device like a smart phone) into a geofenced area surrounding a branch of the convenience store.

As another example of manners and factors in determining to issue a coupon or promotional offer, the consumer may use the consumer computing device to indicate an interest in promotional offers in general or in promotional offers of a particular type. In some embodiments, the consumer uses a program such as a smartphone app or a website that is dedicated to coupons and promotional offers. In other embodiments, the consumer uses a program such as a smartphone app or a website that is dedicated to providing a particular type of service (e.g., a gasoline price/purchase app, a supermarket app, etc.). Regardless of the app, program, or website used, when the consumer indicates interest in coupons or other promotional offers, the promotions provider 52 makes a determination as to whether the consumer is eligible for any applicable coupons or promotional offers.

When the promotions provider 52 determines that the consumer is eligible to receive a coupon or promotional offer, the system does not necessarily immediately issue the coupon or promotional offer. Instead, in some embodiments, the promotions provider systems initially present information about the promotional offer to the consumer computing device 56, whereby the consumer is enabled to evaluate the promotional offer and determine whether or not the promotional offer is one the consumer wishes to take advantage of. If so, the consumer can so indicate by way of an action, such as an interaction with a program, app, or website, as is known in the art. In other embodiments, such as when the consumer has already expressed an interest in promotional offers or coupons, the promotions provider 52 may immediately proceed to issuing a coupon or formal promotional offer.

At the point where the promotions provider 52 determines to issue a coupon or promotional offer, one of the serialized promotional offers or coupons is allocated to the promotional offer, and a one-time-use bank card number is assigned to the promotional offer or coupon. For example, where the bank card number is a MasterCard number, the bank card number assigned to the promotional offer or coupon may be a sixteen-digit number. The bank card number acts as a redeemable code for redemption of the offer or coupon. Where information about coupons and/or offers is maintained on a blockchain, the bank card number associated with the offer/coupon is recorded to the blockchain, potentially along with information associated with the consumer to whom the offer/coupon is to be issued, along with information indicating that the offer/coupon was issued to the consumer. The offer or coupon is then issued to the consumer using the consumer computing device 56.

The consumer may receive and use the coupon or offer in a variety of different ways. In some embodiments, the consumer receives a printable coupon, and may use a printing device (not shown in FIG. 3) to print the coupon for use at a point of sale. The printable coupon includes the bank card number to facilitate redemption of the coupon at the point of sale. In other embodiments, the consumer receives an electronic coupon that the consumer is able to redeem at the point of sale by, for example, displaying the electronic coupon on his or her smartphone (e.g., the consumer computing device 56) either for scanning or manual entry of the bank card number at a point-of-sale device. Accordingly, FIG. 3 illustrates that the system of some embodiments includes a point-of-sale device 58 or system that is adapted to receive entry of the bank card number, either from the point-of-sale operator or from the consumer computing device 56. In some embodiments, the consumer computing device 56 and the point-of-sale device 58 are able to communicate with each other, such as wirelessly (e.g. near-field communication (NFC)). In other embodiments, the consumer receives the bank card number and is able to store it on a consumer magnetic strip adapted to be read by traditional magnetic strip readers at the point-of-sale device 58.

When the point-of-sale device receives the bank card number, the point-of-sale device initiates an authorization process with the bank card processor 54. Accordingly, the point-of-sale device 58 is in at least transient or intermittent communicative connection with the bank card processor 54. The bank card processor 54 performs an authorization step to verify that the bank card number is valid and unused, which step may be performed by communications with the promotions provider 52. Accordingly, the promotions provider 52 has a communicative connection with the bank card processor 54. The promotions provider 52 can then check the bank card number against its records to ensure that the bank card number is valid and has not been used, and can update its records, including the blockchain, to reflect that the coupon or other promotional offer associated with the bank card number has been used and cannot be used again. Assuming the coupon has not yet been used and is otherwise still valid (an applicable promotional period has not expired or passed the expiration date assigned to the bank card number), an authorization is transmitted back to the point-of-sale device.

Funds associated with redemption of the coupon or other promotional offer can then be allocated as necessary on an ongoing basis. In some embodiments, settlement of necessary funds can occur each day at the end of the day. In other embodiments, settlement of funds occurs less frequently, such as every three to five days or weekly. As may be appreciated, settlement of funds may occur on any desired schedule, taking into account ensuring relatively rapid settlement of funds while avoiding unnecessary transfers of small amounts of money repeatedly. In other words, in some embodiments, settlement of funds may occur no later than the earlier of after a certain amount of time has passed or after a minimum settlement amount is owed to a particular retailer or other person or entity associated with redemption of the coupon or other promotional offer.

In some embodiments, settlement occurs with payment to the retailer or other business or individual at which the coupon or other promotional offer was redeemed. In other embodiments, settlement occurs with payment to an account of the consumer that redeemed the coupon or other promotional offer. Each of these involves a slightly different mechanism or process associated with the bank card number of the coupon.

In some embodiments, when the bank card number is issued to the consumer, a fund amount associated with the coupon or promotional offer is associated with the bank card number. In effect, the consumer receives a bank card (equivalent to a gift card) with a monetary value equal to the coupon or promotional offer value (e.g., three dollars, ten euros, etc.). In such embodiments, the bank card number can be used like any traditional credit or gift card as partial payment for the goods or services associated with the promotional offer or coupon. In such embodiments, accordingly, the retailer receives the bank card number at the point-of-sale device 58, and an authorization request is sent to the bank card processor 54 in the amount of the face value of the coupon or other promotional offer. When the authorization is approved (potentially in conjunction with the promotions provider 52), the discount is reflected in the total bill to the consumer at the point-of-sale device 58, and the remaining balance can be paid by the consumer using traditional methods. In this case, funds for the amount of the discount are transferred to the retailer associated with the point of sale.

In other embodiments, when the bank card number is issued to the consumer, no funds are directly associated with the coupon or promotional offer. When the bank card number is received at the point-of-sale device 58, the new authorization transaction with the bank card processor 54 is a zero-value authorization transaction, a zero-ping code, or the like. As this authorization is not a traditional authorization requiring the transfer of actual money to the retailer with guarantees by the bank card processor 54, the bank card processor 54 may optionally charge less for processing this authorization transaction, thereby reducing the cost of processing for the promotional campaign. The promotions provider 52 is still notified of the transaction and is still able to determine whether the transaction relates to an issued and unused coupon or other promotional offer, and can still record the transaction (e.g., on the blockchain), but no money is transferred to the retailer. Instead, at most, an "authorized" transmission is returned to the point-of-sale device 58, and the consumer still pays full price at the point of sale. When it comes time to settle the coupon or promotional offer value, the value is returned directly to the consumer, typically by crediting a consumer account associated with the consumer and/or an app operating on the consumer computing device 56.

Figure 4:
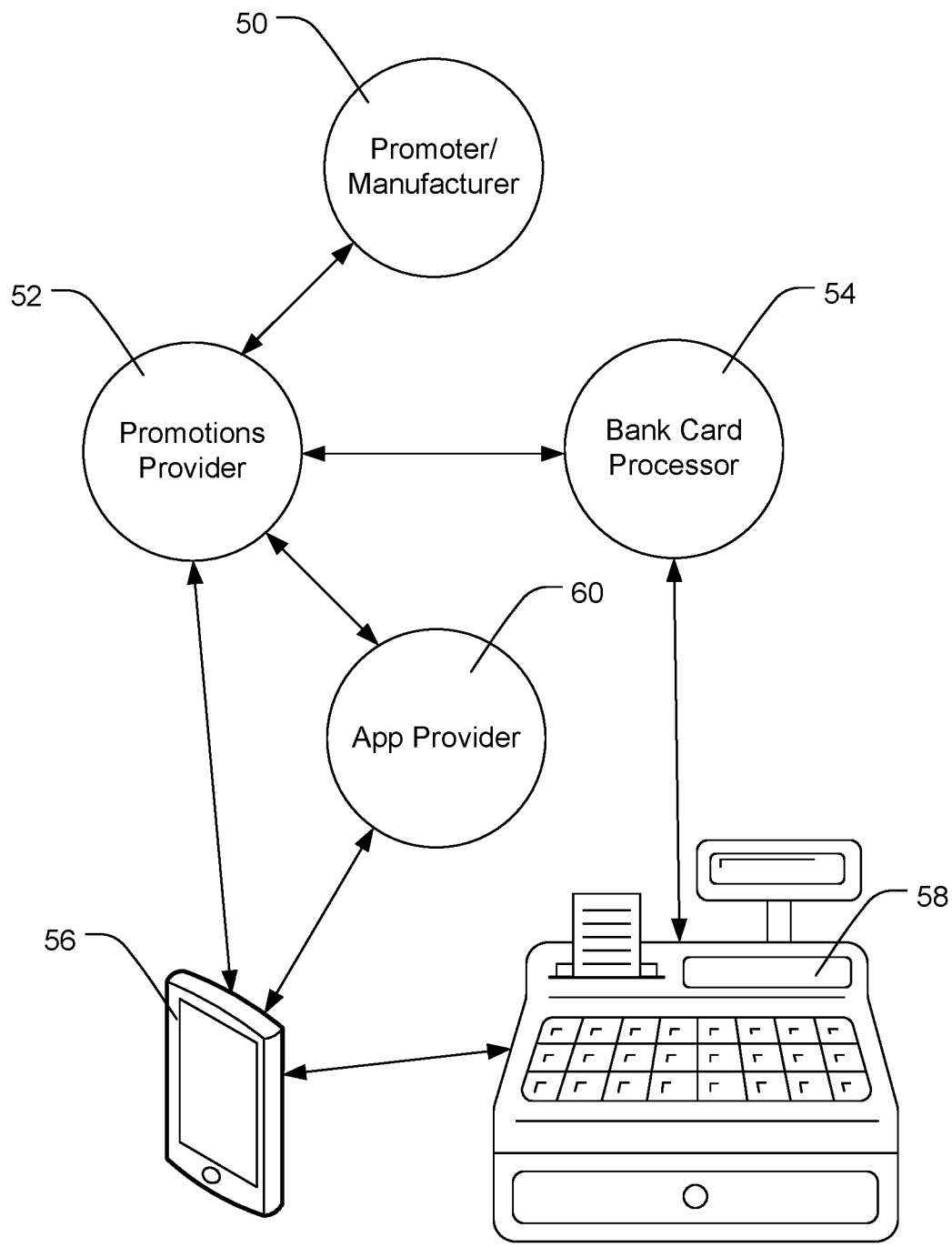
FIG. 4 shows another example of a representative environment in which embodiments of the invention may be implemented.

An example of this is illustrated with respect to FIG. 4. This environment is largely similar to the environment of FIG. 3, with the addition of an app provider 60 that provides an app to the consumer computing device. In some embodiments, the app provider 60 and the promoter 50 are the same business entity or are divisions of the same business entity.

In some embodiments, the app provider 60 and the promotions provider 52 are the same business entity or are divisions of the same business entity. The app provider 60 provides an app that operates on the consumer computing device 56. The app provider 60 may also deliver services to the consumer through the app operating on the consumer computing device 56. By way of example, an app operating on the consumer computing device 56 may provide gas price information to the consumer to facilitate comparison shopping, and may receive and the app provider 60 may deliver updated price information through the app. The consumer may own a consumer account associated with the app, whereby the consumer may receive additional services, discounts, and the like using the app, and may even be able to pay others for goods or services through the app.

In some embodiments, the coupon or other promotional offer is first presented to the consumer through the app provided by the app provider 60. The consumer is also able to accept the offer and receive the coupon or other promotional offer through the app. The consumer may also be able to present the coupon or other promotional offer at the point of sale using the app.

In this environment, when the bank card number is not associated with a value whereby the consumer can partially pay at the point of sale with the bank card number, the system can still provide an equivalent value to the consumer. When the consumer redeems the coupon or other promotional offer at the point-of-sale device 58 and the zero-value authorization transaction occurs, in some embodiments the promotions provider 52 notifies the app provider 60 of the transaction and transfers appropriate funds to the app provider 60. The app provider then credits an account of the consumer on the app with an amount equal to the coupon or other promotional offer. The consumer can then use the funds for goods or services through the app or using the app at other points of sale, if the app provides such functionality. In other embodiments, the app may allow the user to transfer funds from the app to the user's bank account or to other app users.

All this functionality is provided without requiring a direct funds authorization through the bank card processor 54. Instead, because the promotions provider 52 is aware that the coupon or other promotional offer was associated with the bank card number and was issued to the consumer (e.g., upon request of the consumer or upon satisfaction of a geo-location requirement), when the promotions provider 52 receives notification of the zero-value authorization request, the promotions provider 52 knows the coupon or other promotional offer was used and can undertake settlement of the value of the offer through any desired process, including nontraditional mechanisms.

Figure 5:
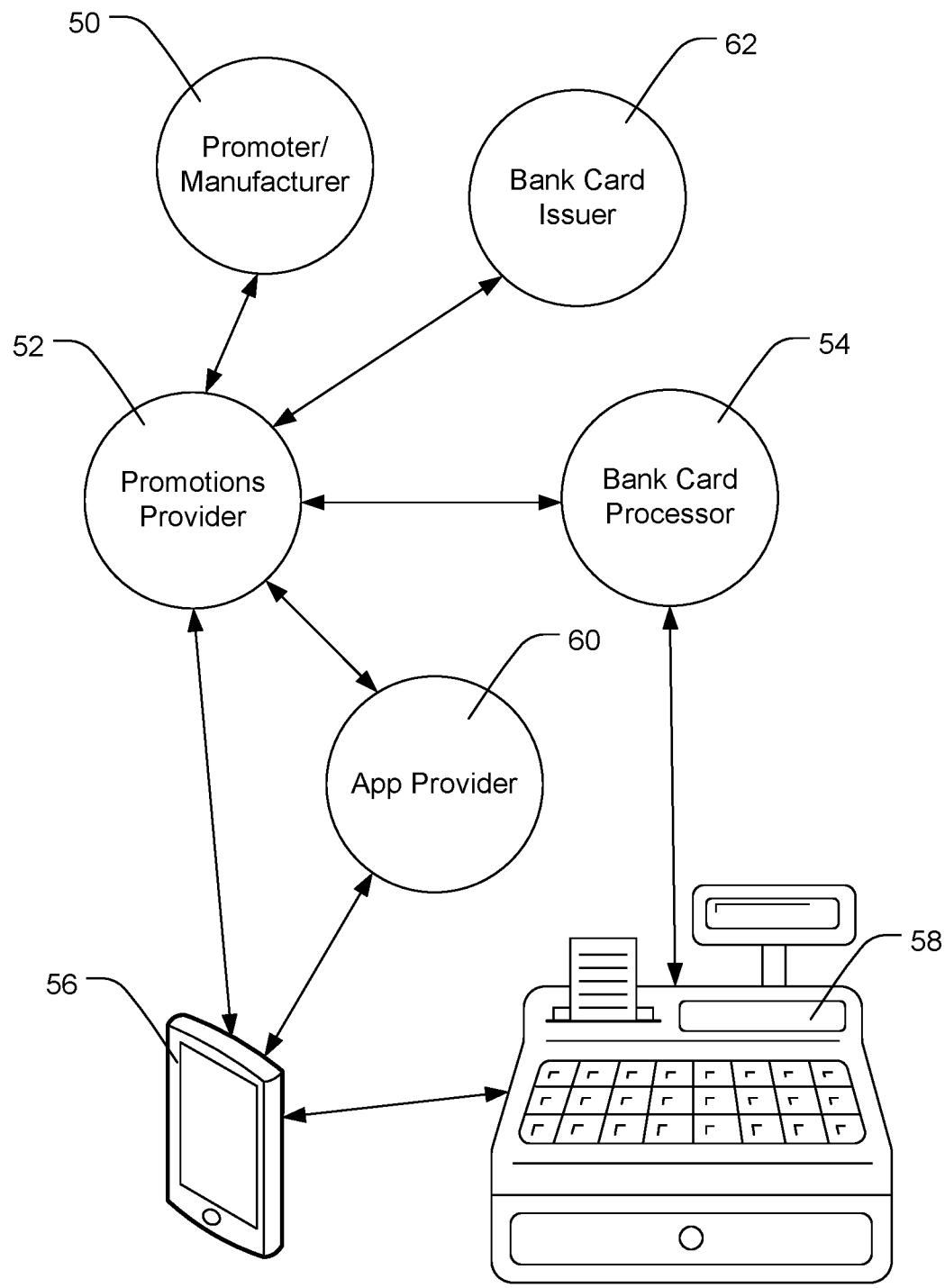
FIG. 5 shows another example of a representative environment in which embodiments of the invention may be implemented.

As may be appreciated, embodiments of the invention utilize bank card numbers for each coupon or other promotional offer. Accordingly, as illustrated in FIG. 5, embodiments of the invention are implemented in a system in which a bank card issuer 62 issues a number of bank card numbers for use in the promotional campaign. As may be appreciated, the obtaining of bank card numbers represents a cost to the promotional campaign. Additionally, the authorization fees charged by the bank card processor 54, whether as zero-value authorizations or authorizations of the face value of the coupon or other promotional offer, are also a cost of the promotional campaign. Accordingly, the promotions provider 52 typically passes such costs on to the promoter 50 when the promotional campaign is initiated. In some instances, lower per-coupon costs may be obtained by way of bulk purchases of bank card numbers and/or by negotiating bulk authorization rates with the bank card processor 54.

Because the use of legitimate bank card numbers in the process represents a cost to the promotional campaign, bank card numbers are typically only associated with coupons or other promotional offers at the time of issuance of a specific coupon or other promotional offer. In embodiments where the coupon or other promotional offer is associated with locational proximity to the location where the coupon or other promotional offer will be used, there is a high likelihood that the coupon or other promotional offer will be redeemed. Nevertheless, a certain amount of non-redeemed offers is to be expected, again representing a cost of the promotional campaign. Nevertheless, embodiments of the invention represent a significant improvement over current coupon promotional campaigns where often a vast number of coupons go unused.

Embodiments of the invention also represent a significant improvement in promoters' and manufacturers' abilities to monitor and control their promotional campaigns. Because coupons and promotional offers can be offered directly to interested consumers and consumers that are in geographic proximity to locations of use, the redemption rate for coupons and other promotional offers is relatively high. Accordingly, fewer overall coupons and promotional offers need be issued, and issuance of coupons and promotional offers can stop at any time, thereby limiting outflow of money relative to the promotional campaign. The promoter 50 and/or manufacturer will not find itself in a position of underestimating the appeal and/or redemption rate of coupons or promotional offers, such that promoters 50 need not be concerned that promotional campaigns will greatly exceed their allocated budgets.

The promotions provider 52 is also able to provide various reports to the promoter 50 to keep the promoter 50 informed of the status of the promotional campaign. Reports may be provided on a scheduled basis, or the promoter 50 is in some embodiments enabled to access reports on demand to view real-time status of the promotional campaign. The promoter 50 and the promotions provider 52 are thus informed and able to take action if necessary to discontinue or modify the promotional campaign.

Embodiments of the invention greatly protect against fraudulent activity, essentially eliminating the opportunity for fraud. Additionally, embodiments of the invention greatly improve the settlement process, whereby the recipients of coupons on redemption no longer need participate in a time-consuming manual or pseudo-manual process to receive reimbursement for received coupons. Instead, the prior months-long settlement process is reduced to as little as a day or a few days. In some embodiments, settlement can occur at the time of each transaction, essentially eliminating all settlement delay. Because fraud is eliminated using embodiments of the invention, settlement occurs at full coupon value, greatly benefiting honest retailers who often received only 80% or less of coupon value using traditional methods.

The promotions provider 52 maintains a full transaction log of all transactions from creation of the promotional campaign through settlement, including serialization of the coupons or other promotional offers, assigning of the bank card numbers on issuance of the coupons or other promotional offers, redemption thereof, and settlement for redeemed offers. In some embodiments, this information is maintained on the blockchain to prevent data tampering. Accordingly, the promotions provider 52 and the promoter 50 are able to fully able to audit the promotional campaign and verify return on investment at any point in the process, representing a significant improvement over prior methods.

Additionally, methods in accordance with embodiments of the invention provide significantly more information to promoters 50 about the effectiveness of their promotional campaigns. Embodiments of the invention allow the promotions provider 52 to track far more information than merely the number of redeemed offers at the end of a promotional campaign. Instead, the promotions provider 52 can track the rate at which offers are accepted by consumers compared to the rate offers were shown to consumers. The promotions provider 52 can also track the rate at which offers are redeemed as opposed to the rate at which offers were accepted by consumers. Furthermore, more granular data can be obtained, such as by way of comparison of offer acceptance and redemption rates in certain locations, with certain timing, and the like. Promoters 50 and manufacturers can accordingly be much better informed as to the effectiveness of their promotional campaigns.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A method distributively performed in a distributed, communicatively connected computing system including a network-connected server device, a payment processor system, a point-of-sale electronic device, and a consumer computing device, the method for preventing fraud in the promotional offer industry, comprising:
   establishing a blockchain on the network-connected server device, the blockchain comprising records to prevent unauthorized uses of promotional offers;
   forming a geofence to create a geofenced area where a promotional offer is likely to be redeemed;
   upon passage of the consumer computing device into the geofenced area, as determined by at least one of GPS data and RFID data obtained from the consumer computing device, determining, using a processor of a network-connected server device, that a consumer operating a consumer computing device in communication with the network-connected server device is eligible to receive a promotional offer;
   transmitting from the server device to the consumer computing device over an electronic communications network information about the promotional offer and displaying the information about the promotional offer on a display of the consumer computing device;
   receiving an action at the consumer computing device indicating interest in the promotional offer and transmitting an indication of interest in the promotional offer from the consumer computing device over the communications network;
   receiving at the server device from the consumer computing device over the communications network the indication of interest in the promotional offer;
   upon receipt of the indication of interest in the promotional offer, retrieving a one-time-use unique bank card number from a non-transitory memory storage device of the server device, and associating the one-time-use unique bank card number with the promotional offer;
   upon association of the bank card number with the promotional offer writing the association of the bank card number with the promotional offer as a transaction on the blockchain;
   transmitting the bank card number from the server device to the consumer computing device as an accepted promotional offer, whereby the consumer is enabled to use the bank card number at a point of sale to redeem the accepted promotional offer;
   using a point-of-sale electronic device at the point of sale to attempt a credit authorization of the bank card number through a payment processor system;
   receiving at the server device, over the communications network but from the payment processor system, an indication that the bank card number was used at the point of sale to redeem the accepted promotional offer; and
   allocating payment for redemption of the promotional offer.

2. The method as recited in claim 1, further comprising:
   upon reception of the indication that the bank card number was used at the point of sale, writing a record of redemption of the promotional offer to the blockchain.

3. The method as recited in claim 1, wherein payment is allocated to a merchant within three days after redemption of the accepted promotional offer.

4. The method as recited in claim 1, wherein payment is allocated to a merchant within one day after redemption of the accepted promotional offer.

5. The method as recited in claim 1, further comprising assigning a value of the promotional offer to the bank card number upon association of the bank card number with the promotional offer, whereby the bank card number can be used as partial payment in an amount of the promotional offer.

6. The method as recited in claim 5, wherein on redemption of the promotional offer at a point-of-sale electronic device, the bank card number is transmitted to a third-party bank card authorization processor.

7. The method as recited in claim 6, wherein payment for redemption of the promotional offer is allocated to a merchant associated with the point of sale.

8. The method as recited in claim 1, wherein a value is not assigned to the bank card number, whereby the bank card number cannot be used as a traditional bank card for partial payment in redemption of the promotional offer, but wherein on redemption of the promotional offer, the bank card number is transmitted to a third-party bank card authorization processor for a no-value authentication that the promotional offer was used.

9. The method as recited in claim 8, wherein payment for redemption of the promotional offer is allocated to the consumer or an account associated with the consumer.

10. The method as recited in claim 1, wherein determining that a consumer operating a consumer computing device is eligible to receive a promotional offer comprises receiving, over the communications network, an indication from the consumer computing device that the consumer computing device has entered a certain geographic area.

11. The method as recited in claim 1, wherein determining that a consumer operating a consumer computing device is eligible to receive a promotional offer comprises:
   receiving, over the communications network, an indication from the consumer computing device representing a request from the consumer for promotional offers; and determining that the promotional offer is one for which the consumer is eligible.

12. The method as recited in claim 1, further comprising:
receiving information regarding a promotional offer campaign involving providing the promotional offer to a plurality of consumers;
serializing a given number of the promotional offer with unique serial numbers;
recording the promotional offers on a blockchain; and
when attempts to redeem the promotional offer are made, checking the blockchain to ensure that each attempted redemption relates to a valid, unredeemed promotional offer before authorizing redemption.

13. The method as recited in claim 12, further comprising generating a report on demand reconciling all promotional offers issued and redeemed, and transmitting the report to a manager of the promotional offer campaign.

14. The method as recited in claim 1, wherein receiving an indication that the bank card number was used at the point of sale to redeem the accepted promotional offer represents entry of the bank card number at a point-of-sale computing device, an authorization transaction between the point-of-sale computing device and an authorization server system, and receipt of an acknowledgement of use of the bank card number from the authorization server system.

15. A method distributively performed in a distributed, communicatively connected computing system including a network-connected server device, a payment processor system, a point-of-sale electronic device, and a consumer computing device,
the method for preventing fraud in the promotional offer industry, comprising:
receiving, at a network-connected server device, information regarding a promotional offer campaign involving providing a promotional offer to a plurality of consumers;
receiving funding for the promotional offer campaign, representing funds and fees to provide redemption of a determined number of the promotional offer;
serializing a determined number of the promotional offer with unique serial numbers using a processor of the server device;
recording the serialized promotional offers on a blockchain stored on a non-transitory computer-readable medium of the server device;
forming a geofence to create a geofenced area associated with a location where the promotional offer is likely to be redeemed;
upon passage of the consumer computing device into the geofenced area, as determined by at least one of GPS data and RFID data obtained from the consumer computing device, determining that a consumer operating a consumer computing device is eligible to receive the promotional offer using logic operating on the server device by checking a locational proximity of the consumer operating the consumer computing device;
transmitting from the server device to the consumer computing device over an electronic communications network information about the promotional offer and displaying the information about the promotional offer on a display of the consumer computing device;
receiving an action at the consumer computing device indicating interest in the promotional offer and transmitting an indication of opting-in to the promotional offer from the consumer computing device over the communications network;
receiving at the server device from the consumer computing device over the communications network the indication of opting-in to the promotional offer;
upon receipt of the indication of interest in the promotional offer, retrieving a one-time-use unique bank card number from the non-transitory computer-readable medium of the server device, and associating the one-time-use unique bank card number with the promotional offer;
transmitting the bank card number from the server device to the consumer computing device as an accepted promotional offer, whereby the consumer is enabled to use the bank card number at a point of sale to redeem the accepted promotional offer;
using a point-of-sale electronic device at the point of sale to attempt a credit authorization of the bank card number through a payment processor system;
receiving, at the server device, over the communications network but from the payment processor system, an indication that the bank card number was used at the point of sale to redeem the accepted promotional offer as a redeemed promotional offer;
confirming on the blockchain at the server device that the redeemed promotional offer has not yet been used;
allocating payment for redemption of the promotional offer; and
updating the blockchain to show that the redeemed promotional offer has been used.

16. The method as recited in claim 15, further comprising assigning a value of the promotional offer to the bank card number upon association of the bank card number with the promotional offer, whereby the bank card number can be used as partial payment in an amount of the promotional offer.

17. The method as recited in claim 16, wherein on redemption of the promotional offer at a point-of-sale electronic device, the bank card number is transmitted to a third-party bank card authorization processor.

18. The method as recited in claim 17, wherein payment for redemption of the promotional offer is allocated to a merchant associated with the point of sale.

19. The method as recited in claim 15, wherein a value is not assigned to the bank card number, whereby the bank card number cannot be used as a traditional bank card for partial payment in redemption of the promotional offer, but wherein on redemption of the promotional offer, the bank card number is transmitted to a third-party bank card authorization processor for a no-value authentication that the promotional offer was used.

20. The method as recited in claim 19, wherein payment for redemption of the promotional offer is allocated to the consumer or an account associated with the consumer.

* * * * *